United States Patent [19]

Miyamura et al.

[11] Patent Number: 4,940,450
[45] Date of Patent: Jul. 10, 1990

[54] POWER TRANSMISSION SYSTEM USING TOOTHED BELT OF ENGINE FOR VEHICLE

[75] Inventors: Noriyuki Miyamura; Seizo Iwasa, both of Kyoto; Hiroshi Asano, Kameoka; Isamu Nagai, Nagaokakyo; Hayato Hamada, Kyoto; Shuji Sasaki; Takeshi Kinoshita, both of Kameoka; Masaru Sui, Uji, all of Japan

[73] Assignee: Mitsubishi Jidosha Kogyo Kabushiki Kaisha, Tokyo, Japan

[21] Appl. No.: 313,968

[22] PCT Filed: Jun. 13, 1988

[86] PCT No.: PCT/JP88/00563

§ 371 Date: Feb. 17, 1989

§ 102(e) Date: Feb. 17, 1989

[87] PCT Pub. No.: WO88/10384

PCT Pub. Date: Dec. 29, 1988

[30] Foreign Application Priority Data

Jun. 17, 1987 [JP] Japan ............................ 62-92083[U]
Feb. 19, 1988 [JP] Japan ............................ 63-21064[U]

[51] Int. Cl.⁵ .............................................. F16H 55/30
[52] U.S. Cl. .................................... 474/152; 474/153
[58] Field of Search ............................ 474/152-153, 474/159; 198/844, 845; 29/159 R

[56] References Cited

U.S. PATENT DOCUMENTS 4,634,409  1/1987  Johnson et al. ............... 474/153 X
4,687,261  8/1987  Atkin ............................ 474/153 X

FOREIGN PATENT DOCUMENTS

53-115252   2/1985  Japan .
60-178653  11/1985  Japan .
60-185759  12/1985  Japan .
61-40550    3/1986  Japan .
61-93654    6/1986  Japan .
62-50364    3/1987  Japan .
56158557    4/1988  Japan .

Primary Examiner—Thuy M. Bui
Attorney, Agent, or Firm—Oblon, Spivak, McClelland, Maier & Neustadt

[57] ABSTRACT

A power transmission system transmits rotative power from a driver pulley to a driven pulley through a toothed belt. The tooth tips (27b) and/or tooth bottoms (27c) of teeth of at least the driven pulley (10) lie in a plane including a central axis $l_2$ of rotation of the driven pulley and are inclined with respect to the central axis $l_2$. When the toothed belt (14) is operated to transmit the rotative power, the position where teeth of the pulley (10) and teeth of the toothed belt (14) start meshing with each other is progressively displaced, thus lowering the level of impact sounds produced when the teeth mesh with each other.

1 Claim, 8 Drawing Sheets

FIG. 7 (750rpm) (a)

FIG. 7 (750rpm) (b)

POWER TRANSMISSION SYSTEM USING TOOTHED BELT OF ENGINE FOR VEHICLE

Technical Field:

The present invention relates to a system for transmitting rotative power from a driver element to a driven element, and more particularly to a power transmission system employing a toothed belt and pulleys around which the toothed belt is trained. Background Art:

Generally, a train of gears or a coupling means for coupling a gear train and a rotatable shaft is employed to transmit the rotation of a driver shaft to a driven shaft. Such means for transmitting rotative power are however disadvantageous in that the number of parts required is increased as the distance between the driver and driven shafts becomes larger. On the other hand, a power transmission system using a belt is employed in many applications since it is free from the problem of the increased number of components needed.

A power transmission system using a toothed belt and toothed pulleys, in particular, can reliably keep constant the ratio between the rotational speeds of driver and driven shafts, and is used as a timing belt transmission device for use in an internal combustion engine.

Figure 9:
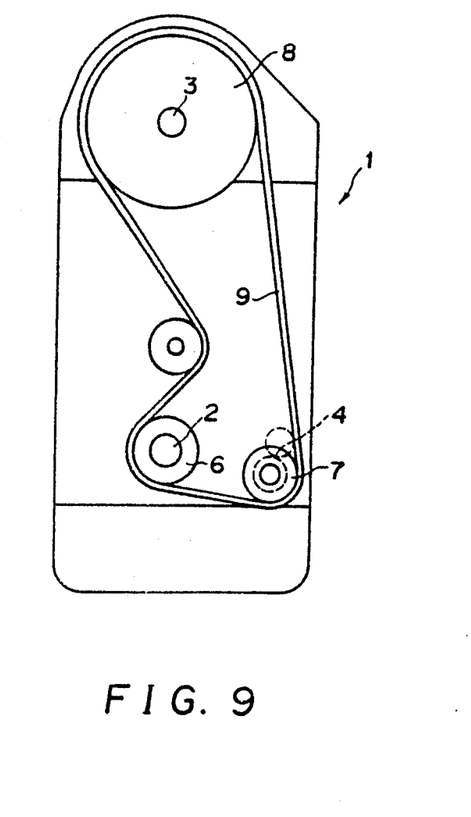
FIG. 9 is a schematic front elevational view of a conventional power transmission system using a toothed belt.

More specifically, as shown in FIG. 15 of the accompanying drawings, an automotive internal combustion engine 1 has a crankshaft 2 projecting from the front wall of the engine. Rotative power from the crankshaft 2 is transmitted through a power transmission system using a toothed belt to a camshaft 3, an oil pump 4, a water pump (not shown), a balancer shaft (not shown), and the like. A pulley 6 mounted as a driver pulley on the crankshaft 2 transmits its rotative power through a toothed belt 9 to driven pulleys 7, 8 coupled to the accessories.

The tooth profile of the pulleys and toothed belt of the toothed belt transmission system is selected such that any loss of the rotative power transmitted between the pulleys and toothed belt when they mesh with each other will be minimized. Specifically, the tooth profile which is used should allow the pulley and the toothed belt to start meshing with each other simultaneously over entire meshing teeth in their longitudinal direction and also should prevent the meshing teeth from being displaced relatively to each other in their longitudinal direction. To meet these requirements, the teeth of conventional pulleys and toothed belts have had tooth profiles parallel to the longitudinal direction of the teeth, e.g., spur gear tooth profiles.

The problems to be solved by the present invention will be described below.

The belt is subject to large tension over the span between the pulley 6 on the crankshaft 2 and the pulley 7 adjacent thereto for driving an accessory. Between the pulleys 6, 7 and the toothed belt 9, intermeshing teeth start meshing with each other simultaneously over their entire longitudinal area to transmit rotative power. When these teeth of the belt and the pulleys mesh with each other, however, the intermeshing teeth hit each other and produce impact sounds, which vary with the rotational speeds of the pulleys.

The impact sounds are liable to amplify the vibration of the teeth belt 9, and the toothed belt 9 gives off noise due to resonance thereof upon the amplified vibration, resulting in a shortened belt life.

Japanese Utility Model Publication No. 55-19324 disclosed an improved power transmission system using a toothed belt. With the disclosed power transmission system, when a belt and a pulley start to mesh with each other, the tip of a tooth of the belt engages into a tooth groove in the pulley while the tooth tip is being elastically deformed. Then, a tooth tip of the pulley and the bottom of a tooth groove in the belt engage each other in a final period of the meshing cycle. The impact between the tooth tip of the pulley and the bottom of the tooth groove in the belt, which has maximized the level of the hitting sounds, can be dampened beforehand by the elastic deformation of the tooth of the belt.

However, the teeth of the pulley and belt are still nevertheless caused to start meshing with each other in the entire longitudinal direction of the teeth, and hence the level of the impact sounds produced when the teeth mesh each other cannot sufficiently be suppressed.

Therefore, it is a first object of the present invention to provide a power transmission system using a toothed belt, which can greatly reduce impact sounds that are produced when teeth mesh with each other and also suppress noise caused by belt vibration. A second object of the present invention to provide a power transmission system using a toothed belt, which can employ many tooth profiles with increased design freedom as teeth for reducing impact sounds.

DISCLOSURE OF THE INVENTION:

Rotative power from a driver pulley mounted on a drive shaft is transmitted at a prescribed rotational speed ratio to a driven pulley through a toothed belt.

The driver and driven pulleys have teeth for meshing with teeth of the toothed belt. The tooth tips of the teeth of at least the driven pulley lie in a plane including a central axis of rotation of the driven pulley and are inclined with respect to the central a xis. The meshing engagement between the teeth of the driven pulley and the toothed belt is progressively displaced in the longitudinal direction of the teeth, thus reducing the level of impact sounds produced when the teeth mesh with each other, the vibration of the toothed belt, and noise thereof.

Moreover, the tooth bottoms of the teeth of the driven pulley lie in a plane including a central axis of rotation of the driven pulley and are inclined with respect to the central axis. This arrangement is also effective to reduce impact sounds produced when the teeth mesh with each other, and noise due to the vibration of the belt. The tooth profile of the teeth of the pulleys can be designed with greater freedom in many configurations.

BEST MODE FOR CARRYING OUT THE INVENTION:

Embodiments of the present invention will hereinafter be described with reference to the drawings.

Figure 1:
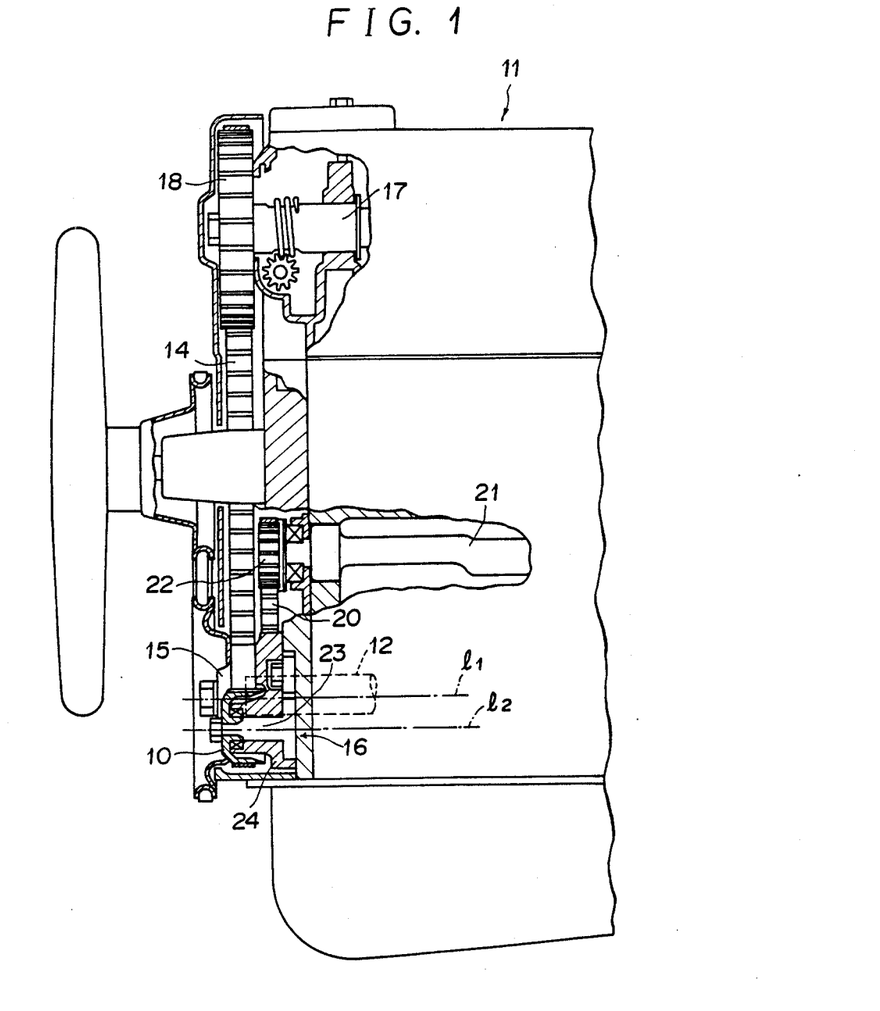
FIG. 1 is a fragmentary side elevational view, partly broken away, of an engine incorporating a power transmission system using a toothed belt according to the present invention.
Figure 2:
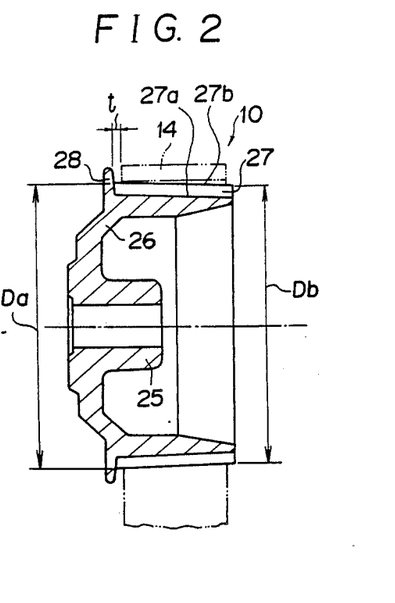
FIG. 2 is an enlarged cross-sectional view of a tapered pulley shown in FIG. 1.

FIG. 1 shows in sectional side elevation a power transmission system using a toothed belt, which is mounted on a vehicle engine 11. FIG. 2 illustrates in enlarged cross section an oil pump pulley (hereinafter referred to simply as a "tapered pulley") 10 as a driven pulley.

The vehicle engine 11 has a crankshaft 12 projecting beyond a front wall of the engine body, and a crank pulley 15 is mounted as a driver pulley on the projecting end of the crankshaft 12. The crankshaft 12 is rotatable about its own central axis . A second pulley 19 is also mounted on the crankshaft 12 in coaxial relation to the crank pulley 15. Various accessories of the engine can be driven by these pulleys on the crankshaft 12.

The power transmission system according to the present invention includes the crank pulley 15, the tapered pulley 10, a timing gear 18 fixedly mounted on a camshaft 17, and a toothed belt 14 trained around these pulleys. Rotative power from the crankshaft 12 is transmitted by the toothed belt 14 to the camshaft 17 and also to an oil pump 16 as an engine accessory.

The engine 11 has a balancer shaft 21 for canceling out vibration produced during rotation of the engine. The balancer shaft 21 is driven by a second toothed belt 20 which is trained around the second pulley 19 and a balancer shaft pulley 22 mounted on the balancer shaft 21.

The toothed belt 14 has a series of spur gear teeth on its entire inner peripheral surface, and is made as a timing belt of known reinforced rubber.

The crank pulley 15 and the timing gear 18 have spur gear teeth shaped to mesh with the teeth on the entire inner peripheral surface of the toothed belt 14.

The tapered pulley 10 is securely mounted on a driven shaft 23 which is rotatably supported in a bearing 24 in the engine and which has an end for driving the pump 16. As shown in FIG. 2, the tapered pulley 10 comprises a boss 25, a rim 26, teeth 27 for meshing with the toothed belt 14, and a flange 28, which are integrally made of a sintered alloy. The teeth 27 have tooth tips 27b each lying in a plane containing the central axis $l_2$ of rotation of the shaft 23 and inclined with respect to the central axis $l_2$. Therefore, each tooth tip 27b revolves along a tapered circular path having a frustoconical shape. Stated otherwise, the portion of the pulley which has the tooth tips 27b thereon has a front outside diameter Da near the flange 28 and an axially opposite rear outside diameter Db that is smaller than the front outside diameter Da. In the illustrated embodiment, the tooth tips 27b and tooth bottoms 27c of the teeth 27 are smaller in radius at their rear ends than at their front ends by 0.4 mm (with the width of each tooth being 22 mm).

The extent and direction of the taper of the teeth 27 vary from engine type to engine type and are of experimentally selected values. It is preferable that the extent of the taper of the teeth be in the range of from 1/15 to 1/40 in view of desired noise level and belt durability.

In FIG. 2, the flange 28 is disposed on the front larger-diameter side of the tapered pulley 10. The flange 28 is formed as a means for preventing the belt 14 from being displaced in the longitudinal directions of the teeth which are indicated by the arrow A.

More specifically, when the toothed belt 14 meshes with the tapered pulley 10, the direction of the central line of the toothed belt 14 becomes continuously varied between meshing and unmeshing portions of the belt 14, and the toothed belt 14 tends to move toward the flange 28 on the larger-diameter side thereof.

In order to minimize the amount of such movement of the belt 14 on the tapered pulley 10, the flange 28 is positioned so that the distance t of the flange 28 from the end face of the belt 14 in its nominal position will be 2.0 mm or less.

Figure 3:
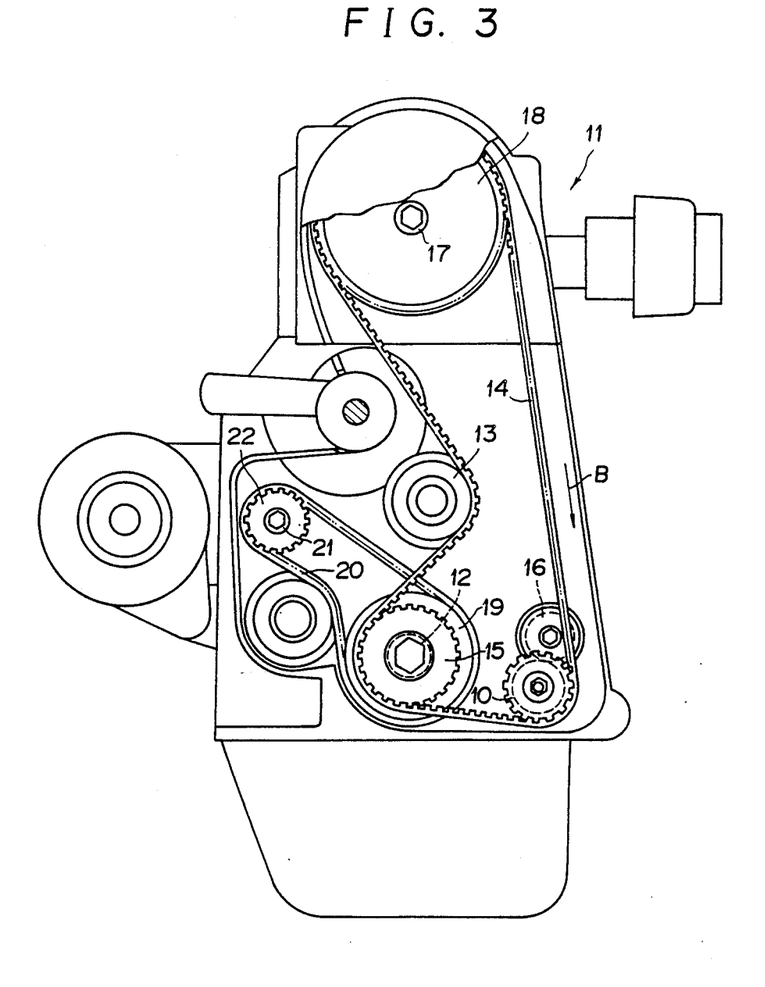
FIG. 3 is a front elevational view, partly cut away, of the engine shown in FIG. 1.

In FIG. 3, an idler 13 serves to remove any slack from the toothed belt 14.

Upon operation of the engine 11, the power transmission system transmits the rotative power of the crankshaft 12 to the tapered pulley 10 and the timing gear 18. At this time, the toothed belt 14 is rotated clockwise as indicated by the arrow B in FIG. 3.

The span of the belt 14 between the crank pulley 15 and the tapered pulley 10, which is apt to cause noise, is on the tensioned side, and the span thereof between the crank pulley 15 and the timing gear 18 is on the slackened side.

Figure 4:
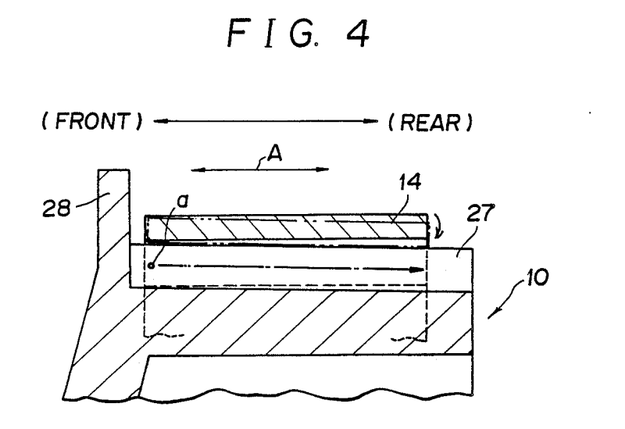
FIG. 4 is a view showing the manner in which a toothed belt and the tapered pulley of FIG. 1 mesh with each other.

As illustrated in FIG. 4, the teeth of the tapered pulley 10 which is the driven pulley and the teeth of the toothed belt 14 start meshing with each other in a front position a in the longitudinal direction A of the teeth, and then the meshing region expands progressively toward the rear side until the teeth mesh with each other fully across the tooth width in the longitudinal direction A. Since the teeth begin to mesh with and abut against each other in their partial regions, any impact sounds produced at this time are held to a minimum. Thereafter, the position where the teeth abut against each other due to their meshing engagement is progressively displaced toward the rear side. Accordingly, the progressively repeated meshing engagement of the teeth is dispersed within a prescribed period of time, with the result that the level of the impact sounds due to the meshing engagement of the teeth is reduced to a relatively low level. Since the radius of the tapered pulley is continuously varied, the toothed belt is subjected to a distribution of different tensions in the transverse direction of the belt (i.e., in the longitudinal direction of the teeth), and the tapered pulley has different resonant rotational speeds at front and rear positions thereon. Therefore, the resonance of the entire span is not simultaneously generated, and is reduced. Inasmuch as the belt undergoes different tensions thereacross, torsional forces are applied to the belt across the the width or in the transverse direction thereof, and are imposed as resistive forces against lateral vibrations, dampening the resonance. The reduction of the impact sounds, the prevention of the belt resonance, and the prevention of the lateral belt vibration are effective in reducing the noise level of the power transmission system, particularly in reducing noise (cycling sounds) when the engine is idling.

Experimental data obtained by the inventor will be described below. FIGS. 5(a), 5(b), 5(c), and 5(d) show measured data on the relationship between the span vibration level and the engine rotational speed. The same type of engine as shown in FIG. 1 was employed, and the vibration levels (primary frequency component upon meshing engagement) at the center of the span of the tapered pulley and the crank pulley were measured. The data shown in FIGS. 5(b) and 5(d) were obtained when a tapered pulley was mounted, and the data of FIGS. 5(a) and 5(c) were obtained when an existing pulley (not shown) having spur gear teeth was mounted.

Figure 5A:
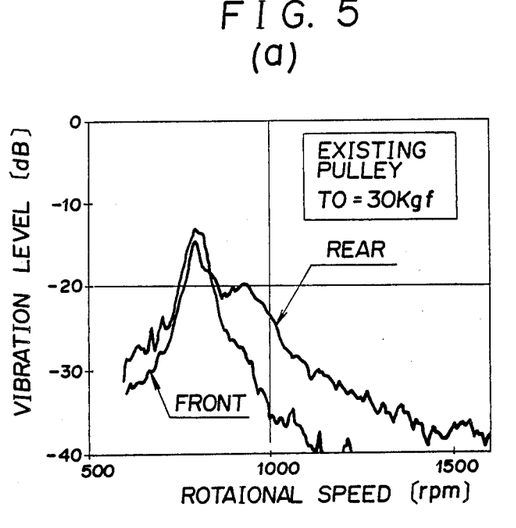
FIGS. 5(a) and 5(c) are graphs showing different characteristics curves each indicating the relationship between a span vibration level and an engine rotational speed according to an existing power transmission system using a toothed belt.
Figure 5B:
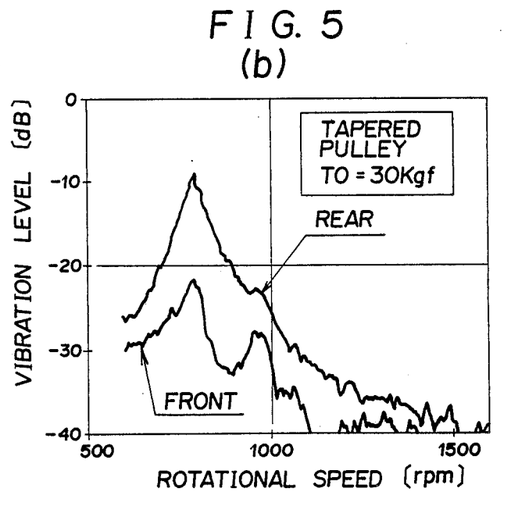
FIGS. 5(b) and 5(d) are graphs showing different characteristics curves each indicating the relationship between a span vibration level and an engine rotational speed according to the power transmission system shown in FIG. 1.
Figure 5C:
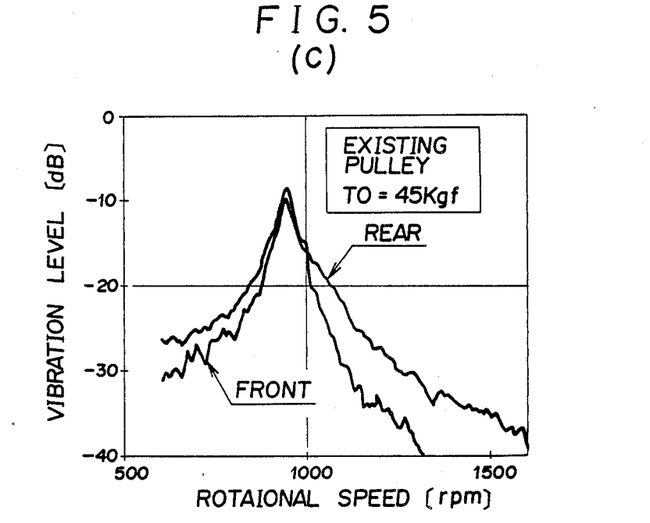
Figure 5D:
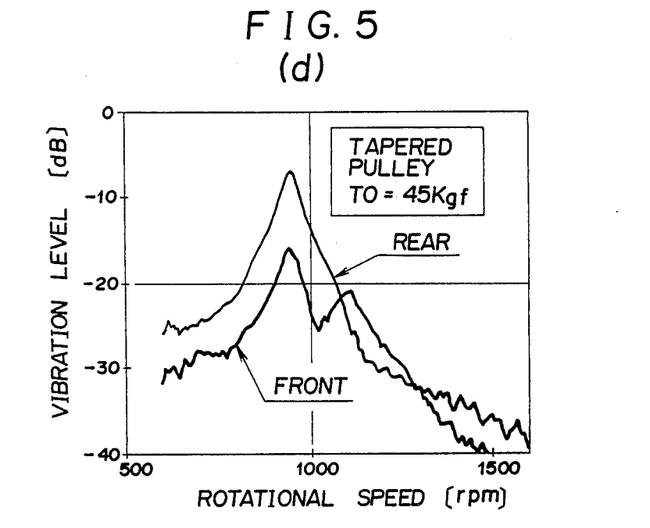

The data of FIGS. 5(a) and 5(b) were produced when the belt tension TO was 30 kgf, and indicate that the vibration level at the front side is much lower with the tapered pulley than with the existing pulley at the engine speed of 700 rpm. The data of FIGS. 5(c) and 5(d) were produced when the belt tension TO was 45 kgf, and indicate that the vibration level at the front side is much lower with the tapered pulley than with the existing pulley at the engine speed of 900 rpm.

Figure 6:
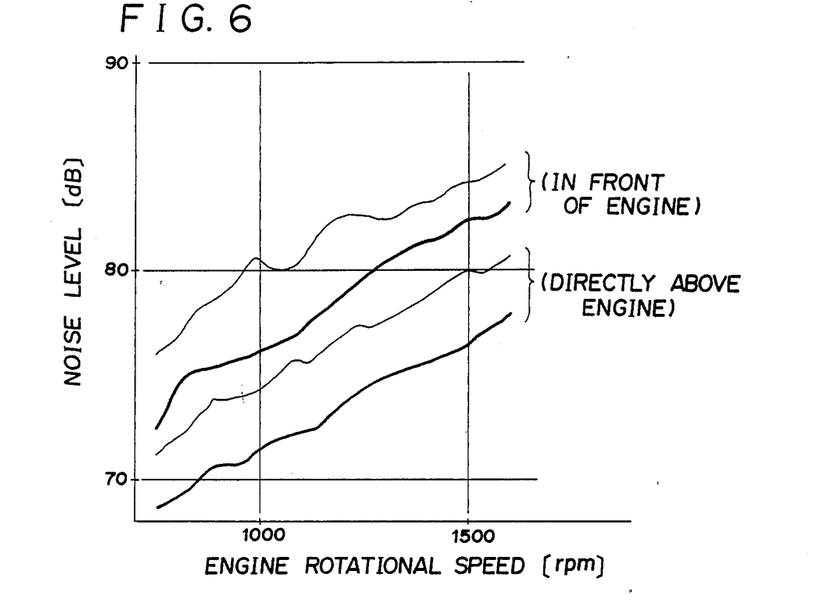
FIG. 6 is a graph illustrating, for comparison, noise levels of the power transmission system of FIG. 1 and the existing power transmission system, dependent on the engine rotational speed.
Figure 7:
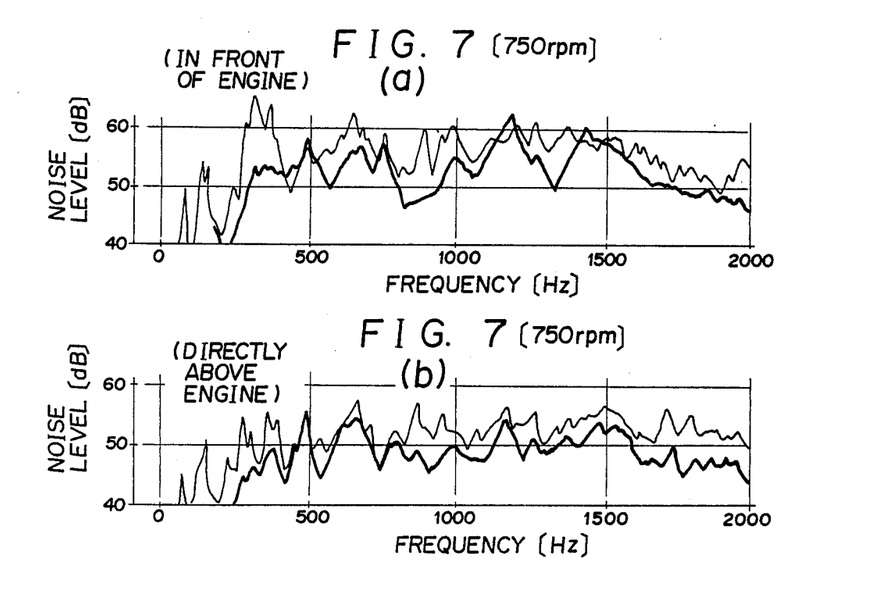
FIGS. 7(a) and 7(b) are graphs showing frequency vs. noise level characteristic curves at different measuring positions of the power transmission system illustrated in FIG. 1.

FIG. 6 shows, for comparison, experimental data representing noise levels when the existing pulley was used (thinner solid lines) and when the tapered pulley was used (thicker solid lines), dependent on the engine rotational speed. It can readily be seen from FIG. 6 that the noise level can be reduced by using the tapered pulley either immediately above or in front of the engine. FIGS. 7(a) and 7(b) show data which were obtained in the same manner as the data of FIG. 6. The data of FIGS. 7(a) and 7(b) represent the vibration frequency (Hz) vs. noise level characteristic curves while the engine speed is maintained at an idling speed (750 rpm). As is apparent from FIGS. 7(a) and 7(b), the noise level is lower when the tapered pulley is used than when the existing pulley is used, in substantially the full range of vibration frequencies Hz.

Figure 8:
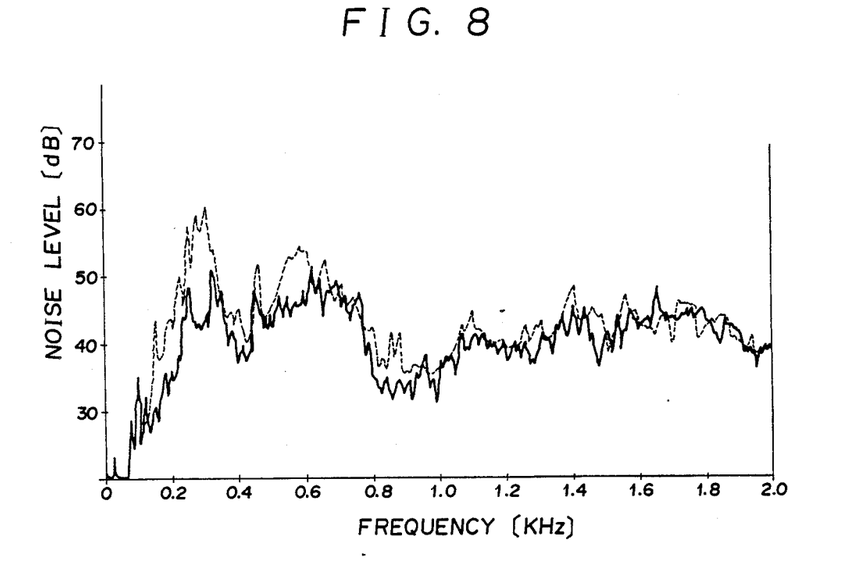
FIG. 8 is a graph showing a frequency vs. noise level characteristic curve of another power transmission system according to the present invention.

FIG. 8 illustrates experimental data obtained when a power transmission system using a toothed belt is mounted on an engine similar to the engine of FIG. 1. The illustrated frequency-dependent noise level was measured above the engine when the tapered pulley used had a front and rear taper of 1/28 mm and the engine rotational speed was 750 rpm. It is clear in FIG. 8 that the noise level (indicated by the solid line) when the tapered pulley was used is lower as a whole than the noise level (indicated by the broken line) when the existing pulley was used. In particular, the noise which is produced during engine idling due to such resonance of the belt span between the crank pulley and the tapered pulley which is liable to happen at the primary frequency (here about 300 Hz) is greatly reduced in level.

In the above embodiment, the tapered pulley 10 has a smaller radius at its rear end than at its front side. However, the tapered pulley 10 may be tapered in the opposite direction to provide the flange 28 on the rear larger-diameter end thereof. While the teeth 27 of the tapered pulley 10 are tapered fully in the longitudinal direction A of the teeth in the illustrated embodiment, the tapered pulley may have spur gear teeth on the larger-diameter side and tapered teeth extending continuously from the spur gear teeth.

In the power transmission system shown in FIG. 1, only the tooth tips of the driven tapered pulley 10 are tapered to follow a frustoconical path when the tapered pulley 10 rotates. However, the tooth tips of the driver crank pulley 15 may also be tapered to follow a frustoconical path.

The flange 28 on the front larger-diameter end of the tapered pulley 10 in the power transmission system shown in FIG. 1 may be dispensed with. With such an alternative, a flanged idler (not shown) may be provided between the driver and driven pulleys for preventing the belt from being displaced transversely to limit belt displacement on the pulleys.

The teeth of the tapered pulley 10 and the timing belt pulleys 32, 33 in the power transmission systems shown in FIG. 1 have constant heights, and their tips and bottoms lie in the planes including the central axes $l_1$, $l_2$, $l_3$, $l_4$ and are inclined to these central axes.

The present invention thus arranged offers the following advantages:

With the power transmission system of the invention, the meshing engagement between the teeth of the toothed belt and the teeth of at least the driven pulley is not effected simultaneously in the full longitudinal region of the teeth, but is performed progressively in the longitudinal direction of the teeth. Therefore, any impact sounds produced when the teeth mesh with each other are dispersed, lessened, and lowered in level. Moreover, the progressive meshing of the belt and the pulley, and a change in the belt rigidity due to different tensions on the belt in the transverse direction thereof are effective as resistive forces to cancel out resonance of the belt for lowering noise which would otherwise be caused by belt resonance, in particular, cycling sounds when the engine is idling. The reduction in resonance of the belt results in increased durability of the toothed belt.

In addition, since the teeth of the driver and driven pulleys can be shaped with increased freedom, it is possible to select pulleys and a belt which are best suited to each power transmission system desired, and those which are most effective in reducing noise.

INDUSTRIAL APPLICABILITY:

The power transmission system using a toothed belt according to the present invention is highly useful as a system for transmitting rotative power from a crankshaft to a valve operating mechanism of an engine, and can effectively be used as a rotative power transmission system in which the ratio of rotational speeds of two shaft should be kept constant.

We claim:

1. A power transmission system using toothed belt of engine for vehicle comprising:
   (a) a toothed drive pulley mounted on a drive shaft of an engine, having tooth tips lying in a plane in parallel with a rotational axis of said drive pulley;
   (b) a toothed driven pulley mounted on a drive shaft, having tooth tips tapered so that the diameter of said driven pulley at one axial end thereof is larger than the diameter thereof at the other axial end thereof, and a guide disposed at said one axial end of said toothed driven pulley and having a diameter larger than any diameter of said toothed driven pulley, wherein cross-sectional profiles of said tapered tooth tips of said driven pulley are the same at opposite axial ends of said tooth tips as seen in a plane perpendicular to said driven shaft;

(c) a toothed belt trained around said toothed drive pulley and said toothed driven pulley, said toothed belt having teeth lying in plane parallel to the width of said belt, whereby when said toothed belt is rotated by the drive force of said drive shaft, said toothed belt sequentially meshes with said toothed driven pulley from the larger diameter portion thereof to the smaller diameter portion thereof, thereby transmitting the drive force of said drive shaft to said toothed driven pulley.

* * * * *